US012619137B2

(12) United States Patent
Mao et al.

(10) Patent No.: US 12,619,137 B2
(45) Date of Patent: May 5, 2026

(54) DISPLAY SYSTEM

(71) Applicant: Shenzhen Yinwang Intelligent Technologies Co., Ltd., Shenzhen (CN)

(72) Inventors: Lei Mao, Dongguan (CN); Xiao Li, Dongguan (CN); Zhiyong Huang, Dongguan (CN); Shimao Li, Dongguan (CN); Zhentao Qin, Dongguan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 390 days.

(21) Appl. No.: 18/344,386

(22) Filed: Jun. 29, 2023

(65) Prior Publication Data

US 2023/0341758 A1     Oct. 26, 2023

Related U.S. Application Data

(63) Continuation of application No. PCT/CN2021/139419, filed on Dec. 18, 2021.

(30) Foreign Application Priority Data

Dec. 31, 2020     (CN) .......................... 202011641286.3
Aug. 5, 2021     (CN) ........................ 202110898215.X

(51) Int. Cl.
| | |
|---|---|
| *G03B 21/20* | (2006.01) |
| *G02B 27/09* | (2006.01) |
| *G02B 27/12* | (2006.01) |
| *G03B 21/28* | (2006.01) |
| *G03B 21/62* | (2014.01) |

(52) U.S. Cl.
CPC ....... *G03B 21/208* (2013.01); *G02B 27/0944* (2013.01); *G02B 27/0961* (2013.01); *G02B 27/0966* (2013.01); *G02B 27/126* (2013.01); *G03B 21/28* (2013.01); *G03B 21/62* (2013.01)

(58) Field of Classification Search
None
See application file for complete search history.

(56) References Cited

U.S. PATENT DOCUMENTS

| | | | |
|---|---|---|---|
| 6,072,443 | A | 6/2000 | Nasserbakht et al. |
| 2001/0050817 | A1 | 12/2001 | Travers et al. |
| 2002/0145573 | A1 | 10/2002 | Cheng |
| 2014/0368923 | A1 | 12/2014 | Segawa |
| 2017/0146809 | A1 | 5/2017 | Furuya |

(Continued)

FOREIGN PATENT DOCUMENTS

| | | |
|---|---|---|
| CN | 1773368 A | 5/2006 |
| CN | 101051179 A | 10/2007 |

(Continued)

*Primary Examiner* — Bao-Luan Q Le
*Assistant Examiner* — Danell L Owens
(74) *Attorney, Agent, or Firm* — Leydig, Voit & Mayer, Ltd.

(57) ABSTRACT

A display system is provided. The display system includes a picture generation unit, a diffuser screen, and a curved mirror. The picture generation unit is configured to generate a real image and perform imaging on the diffuser screen. The diffuser screen is configured to perform diffuse reflection on the real image. The curved mirror is configured to perform imaging based on the real image obtained through diffuse reflection, to generate a magnified virtual image.

19 Claims, 12 Drawing Sheets

Reflector 106

Curved mirror 103

Picture generation unit 101

Polarization film 104

Diffuser screen 102

(56) References Cited

U.S. PATENT DOCUMENTS

| | | | |
|---|---|---|---|
| 2019/0255773 A1 | 8/2019 | Ovsianikov et al. | |
| 2020/0301145 A1 | 9/2020 | Li | |

FOREIGN PATENT DOCUMENTS

| | | | | |
|---|---|---|---|---|
| CN | 104133292 A | | 11/2014 | |
| CN | 205028590 U | | 2/2016 | |
| CN | 105700162 A | * | 6/2016 | ............ G02B 30/27 |
| CN | 106707478 A | | 5/2017 | |
| CN | 208000411 U | | 10/2018 | |
| CN | 110221430 A | | 9/2019 | |
| CN | 110780433 A | | 2/2020 | |
| EP | 2570843 A1 | | 3/2013 | |
| JP | 2004514174 A | | 5/2004 | |
| JP | 2008216592 A | * | 9/2008 | ............ G03B 21/60 |
| JP | 2009003282 A | | 1/2009 | |
| JP | 2009086025 A | * | 4/2009 | |
| JP | 2009088032 A | | 4/2009 | |
| JP | 2010117542 A | | 5/2010 | |
| JP | 2013174743 A | | 9/2013 | |
| JP | 2017097189 A | | 6/2017 | |
| JP | 2017111266 A | * | 6/2017 | |
| WO | 2009066475 A1 | | 5/2009 | |
| WO | WO-2015125247 A1 | * | 8/2015 | ......... G02B 27/0101 |

* cited by examiner

Curved
mirror 103

Picture generation
unit 101

Magnified
virtual picture

Diffuser
screen 102

Picture generation unit 101

Picture generation unit 101

Curved mirror 103

Picture generation unit 101

Fresnel lens 107

Diffuser screen 102

Curved mirror 103

Picture generation
unit 101

Naked-eye 3D
screen 108

Diffuser
screen 102

DISPLAY SYSTEM

CROSS-REFERENCE TO RELATED APPLICATIONS

This application is a continuation of International Application No. PCT/CN2021/139419, filed on Dec. 18, 2021, which claims priority to Chinese Patent Application No. 202011641286.3, filed on Dec. 31, 2020 and Chinese Patent Application No. 202110898215.X, filed on Aug. 5, 2021. All of the aforementioned patent applications are hereby incorporated by reference in their entireties.

TECHNICAL FIELD

This application relates to the field of picture display, and in particular, to a display system.

BACKGROUND

Currently, a large-screen display system (for example, a display backplane with a size of at least 80 inches) is expensive. A laser TV can achieve a projection effect of at least 100 inches, but requires a curtain (a Fresnel screen) having a specific function to improve viewing experience, and occupies large space. An existing projector usually requires a large projection distance, cannot generate a magnified picture at a short distance, and has a high requirement on ambient brightness.

SUMMARY

In view of this, an embodiment of this application provides a display system.

According to a first aspect, an embodiment of this application provides a display system, where the display system includes a picture generation unit, a diffuser screen, and a curved mirror.

The picture generation unit is configured to generate a real image and perform imaging on the diffuser screen.

The diffuser screen is configured to perform diffuse reflection on the real image.

The curved mirror is configured to perform imaging based on the real image obtained through diffuse reflection, to generate a magnified virtual image.

In a possible implementation, the picture generation unit includes a light source, a prism, a lens, an imaging chip, and a projection lens.

The light source is configured to emit a light beam.

The prism is configured to combine light beams emitted by the light source.

The lens is configured to collimate a combined light beam and direct the combined light beam to the imaging chip.

The imaging chip is configured to generate the real image.

The projection lens is configured to project the real image onto the diffuser screen.

In a possible implementation, the picture generation unit includes a first diffractive optical element, the diffractive optical element is located between the light source and the prism, and the diffractive optical element is configured to split a light beam emitted by the light source.

In a possible implementation, the display system further includes a second diffractive optical element, the diffractive optical element is located after the curved mirror, and the diffractive optical element is configured to split a light beam reflected by the curved mirror.

In a possible implementation, the display system further includes a polarization film, where the polarization film is placed after the diffuser screen, and the polarization film is configured to filter out interference light.

In a possible implementation, the display system further includes a Fresnel lens. The Fresnel lens is placed after the diffuser screen, and the Fresnel lens is configured to magnify the real image passing through the diffuser screen.

In a possible implementation, the display system further includes a black-and-white grating, a cylindrical lens array, or a microlens array, where the black-and-white grating, the cylindrical lens array, or the microlens array is located after the diffuser screen.

In a possible implementation, the picture generation unit further includes a polarization processing element, and the polarization processing element is configured to adjust a polarization state of the light beam directed to the imaging chip.

In a possible implementation, the display system further includes a reflector, where the reflector is configured to receive the light beam for imaging on the curved mirror and reflect the light beam back to the curved mirror, and the curved mirror is further configured to receive the light beam reflected by the reflector, to perform magnification imaging.

In a possible implementation, the light source includes a plurality of primary-color sub-light sources.

In a possible implementation, the first diffractive optical element includes a plurality of sub-optical elements, and the sub-optical elements are separately placed before a plurality of primary-color sub-light sources.

In a possible implementation, the diffuser screen is a reflection diffuser screen or a projection diffuser screen.

In a possible implementation, the polarization processing element is any one of the following elements: a polarization beam splitter PBS, a quarter-wave plate, a half-wave plate, a polarizer, and a rotator.

In a possible implementation, the curved mirror is a multi-focus curved mirror.

This application provides a display system. The display system may be used in various scenarios in which pictures need to be magnified, and can implement magnification imaging at a short distance. In addition, no specific curtain is required, and small space is occupied.

In a possible implementation, the display system further includes a diffuser film, where the diffuser film is located on a light-emitting side of the diffuser screen, and is configured to expand a transverse scattering angle of the real image obtained through diffuse reflection. In this embodiment, a size of an eye box may be increased through expanding the transverse scattering angle, and a visible angle of the display system may be increased.

In a possible implementation, the display system further includes the cylindrical lens array, where the cylindrical lens array is disposed on a light-emitting side of the diffuser screen and covers pixels of the diffuser screen. Light emitted by pixels passes through different locations of the cylindrical lens array, generates different refraction effects, and diverges in different directions, so that a scattering angle can be further increased. After reflection of the curved mirror, a ray of light may enter eyes of a plurality of different users, to implement a technical effect of multi-user viewing.

In a possible implementation, at least one cylindrical lens in the cylindrical lens array covers at least two columns of pixels (which may be referred to as pixel columns) or at least two rows of pixels (which may be referred to as pixel rows) of the diffuser screen. A quantity of pixel columns or a quantity of pixel rows covered by the cylindrical lens corresponds to users who view the picture. A pixel column is used as an example. A ray of light emitted by one column of pixels may enter eyes of a first user after being refracted by the cylindrical lens and reflected by the curved mirror, and a ray of light emitted by another column of pixels may enter eyes of a second user after being refracted by the cylindrical lens and reflected by the curved mirror. The display system in this embodiment may be viewed by two users.

In a possible implementation, the at least one cylindrical lens in the cylindrical lens array covers three columns of pixels or three rows of pixels of the diffuser screen. A pixel column is used as an example. A ray of light emitted by each column of pixels separately enters eyes of different users after being refracted by the cylindrical lens and reflected by the curved mirror, to implement multi-user viewing. A technical effect that can be implemented by using a pixel row is the same as that of a pixel column.

In a possible implementation, a plurality of pixel columns or pixel rows covered by the at least one cylindrical lens in the cylindrical lens array separately display different pictures, so that the different pictures can be viewed by different users, and an effect that a plurality of users separately view different pictures can be implemented.

In a possible implementation, a plurality of pixel columns or pixel rows covered by at least one cylindrical lens in the cylindrical lens array display a same picture, so that a plurality of users can view the same picture, to implement an effect that a plurality of users view a same picture.

In a possible implementation, the display system further includes a holographic element or a diffusion element, where the holographic element or the diffusion element is located on a light-emitting side of the cylindrical lens array, and is configured to eliminate stripe interference introduced by the cylindrical lens array.

In a possible implementation, a curvature radius and a refractive index of the cylindrical lens in the cylindrical lens array may be adjusted. By adjusting the curvature radius and the refractive index of the cylindrical lens, a location of an eye box may be changed to adapt to locations of human eyes, especially in a scenario in which space is limited, such as in a vehicle.

In a possible implementation, the display system further includes a first reflection element, where the first reflection element is located on an optical path between the picture generation unit and the diffuser screen, and the first reflection element is configured to reflect the real image generated by the picture generation unit to the diffuser screen. The first reflection element in this embodiment may fold the optical path and reduce a size of the display system.

In a possible implementation, the first reflection element is one of a plane mirror, a spherical mirror, or a freeform mirror. The first reflection element may further change a shape of the picture generated by the picture generation unit, to implement distortion correction.

In a possible implementation, the display system further includes a second reflection element, where the second reflection element is located on an optical path between the curved mirror and the diffuser screen, and the second reflection element is configured to reflect, to the curved mirror, the real image obtained through diffuse reflection by the diffuser screen. The second reflection element in this embodiment may fold the optical path and reduce a size of the display system.

In a possible implementation, the second reflection element is one of a plane mirror, a spherical mirror, or a freeform mirror. The second reflection element may further implement distortion correction. For example, picture distortion caused by the second reflection element is complementary to picture distortion caused by the curved mirror, so that the picture distortion caused by the curved mirror can be eliminated.

DETAILED DESCRIPTION OF ILLUSTRATIVE EMBODIMENTS

This application provides a display system. The display system may be used in various scenarios in which pictures need to be magnified, and can implement magnification imaging at a short distance. In addition, no specific curtain is required, and small space is occupied.

Figure 1:
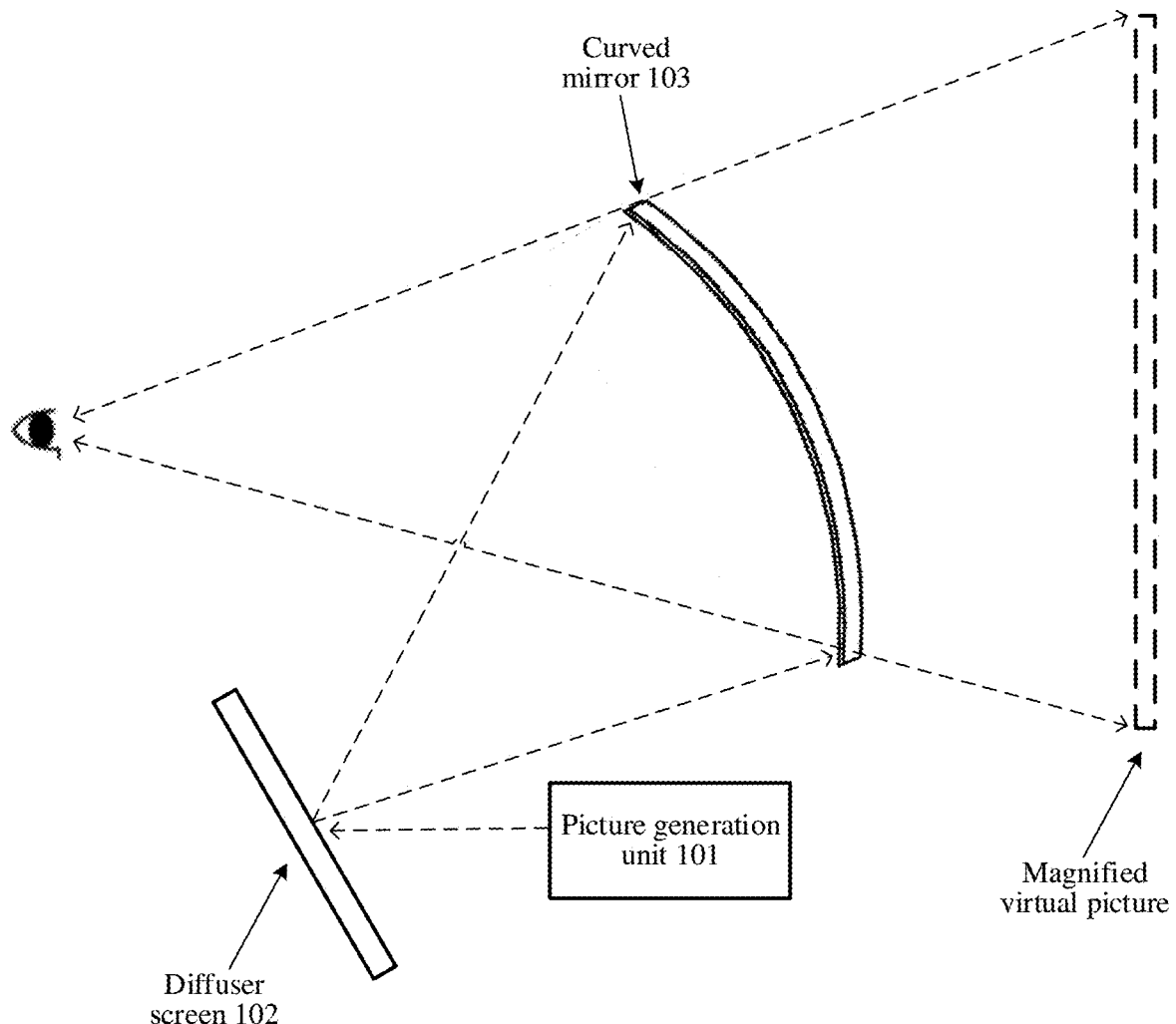
FIG. 1 is a schematic diagram of a structure of a display system according to an embodiment of this application.

FIG. 1 is a schematic diagram of a structure of a display system according to an embodiment of this application. As shown in FIG. 1, the display system includes a picture generation unit 101, a diffuser screen 102, and a curved mirror 103. The picture generation unit 101 generates a real image and performs imaging on the diffuser screen 102. The diffuser screen performs diffuse reflection on the received real image. The curved mirror 103 performs imaging based on the real image obtained through diffuse reflection, to generate a magnified virtual image.

Figure 2:
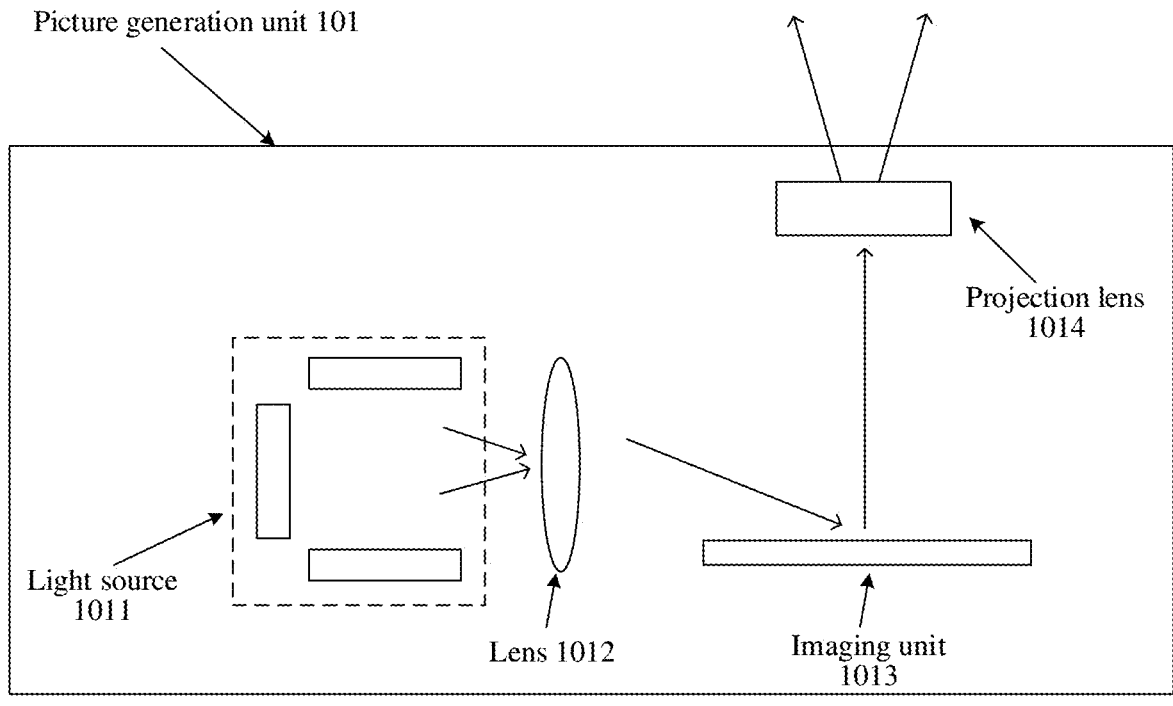
FIG. 2 is a schematic diagram of a structure of a picture generation unit according to an embodiment of this application.

FIG. 2 is a schematic diagram of a structure of a picture generation unit 101 according to this application. As shown in FIG. 2, the picture generation unit 101 includes a light source 1011, a lens 1012, an imaging unit 1013, and a projection lens 1014. The light source 1011 is configured to emit a light beam. The prism is configured to combine light beams emitted by the light source 1011 and emit a combined light beam to the lens 1012. The lens 1012 is configured to collimate the combined light beam and direct the combined light beam to the imaging unit 1013. The imaging unit 1013 generates a real image based on the light beam directed to the lens. The projection lens 1014 is configured to project the real image onto the diffuser screen 102.

The light source 1011 may include a plurality of primary-color light sources, for example, an RGB tri-color light source (red, blue, and green). Pictures of different colors may be generated by adjusting intensity of each primary-color light source. The prism 1012 may combine light beams of each primary-color light source, and a combined light beam of the primary-color light source may be transmitted along a same path.

The imaging unit 1013 may be a polarization-independent imaging chip, for example, a digital optical processor (DLP).

The projection lens may be an ultra-short-focus projection lens, and may provide a compact product size. Generally, a lens projection ratio of a lens needs to be less than or equal to 1.

In this system, the curved mirror serves as an observation window of a user, and a size of the curved mirror is equivalent to that of a conventional desktop display (for example, 10 inches to 35 inches). During use, the user can view a virtual image magnified for several times by using a freeform mirror.

In this embodiment of this application, advantages of a small-sized display and a laser projector PGU are combined. The PGU has advantages such as large-screen projection and excellent color performance. A physical form of a conventional display is replaced with the curved mirror, and the virtual image is magnified by using a small-sized curved mirror screen, to implement ultra-large screen viewing experience and greatly reduce a product size.

It should be noted that the curved mirror in this embodiment of this application may be a multi-focus freeform mirror. A multi-focus freeform reflector is designed to implement multi-user viewing. A circle is a single-focus curve, and corresponds to a common single-focus lens. The single-focus lens is a basis of the freeform mirror in an existing solution, and corresponds to a single observation point. An ellipse is a double-focus curve, and two focuses are image surfaces of each other. In principle, the double-focus curve has two observation points. In principle, a multi-focus curve has a plurality of observation points. Therefore, the multi-focus freeform reflector may be designed to implement multi-user viewing.

Figure 3:
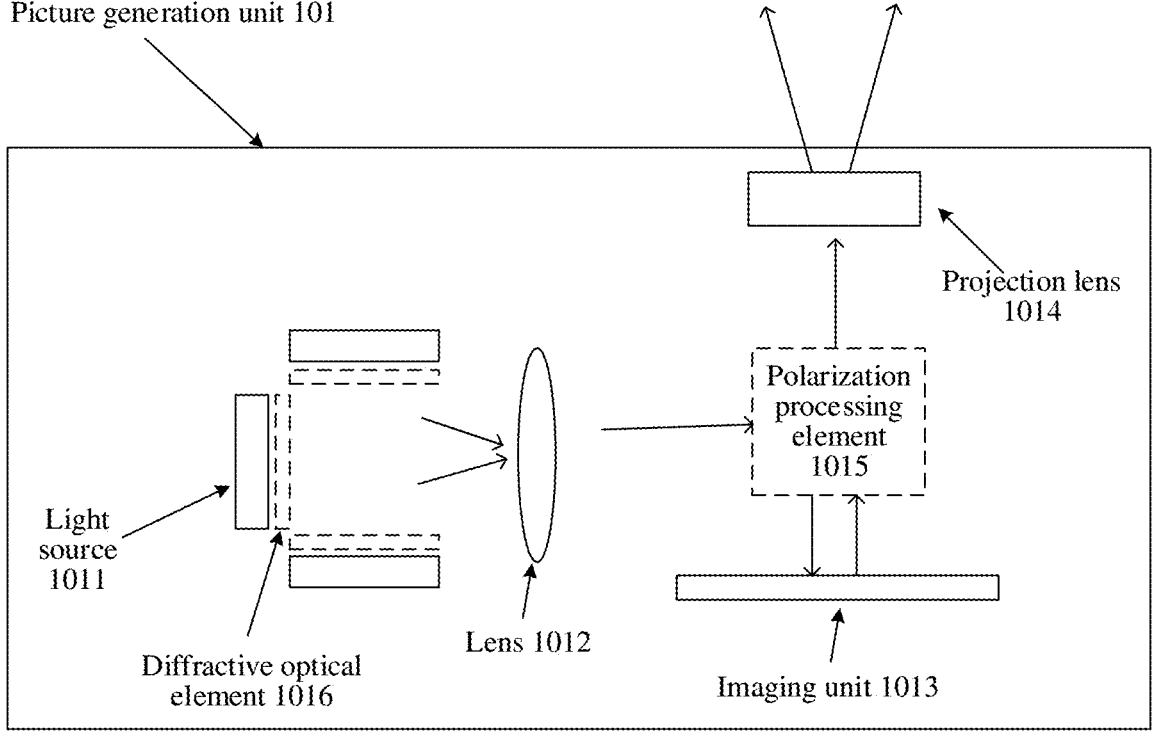
FIG. 3 is a schematic diagram of a structure of another picture generation unit according to an embodiment of this application.

FIG. 3 is a schematic diagram of a structure of another picture generation unit 101 according to this application. A difference between the picture generation unit 101 shown in FIG. 3 and the picture generation unit 101 shown in FIG. 2 lies in that:

The picture generation unit 101 may further include a polarization processing element 1015. In this case, an imaging unit 1013 may be a polarization-related imaging chip, for example, a liquid crystal on silicon (LCOS). The polarization processing element 1015 may be a polarization beam splitter (PBS), a quarter-wave plate, a half-wave plate, a polarizer, or a rotator. The polarization processing element 1015 is configured to adjust a polarization state of a light beam directed to the imaging unit 1013.

The picture generation unit 101 may further include a diffractive optical element 1016. The diffractive optical element 1016 may be a grating. The diffractive optical element 1016 is mainly configured to split a light beam emitted by a light source 1011. In a scenario in which there are a plurality of primary-color light sources, there may be a plurality of diffractive optical elements 1016. There is one diffractive optical element 1016 before each primary-color light source. Each diffractive optical element 1016 may adjust an angle of splitting a light beam of each primary-color light source, so that a prism combines light beams emitted by each primary-color light source.

Figure 4:
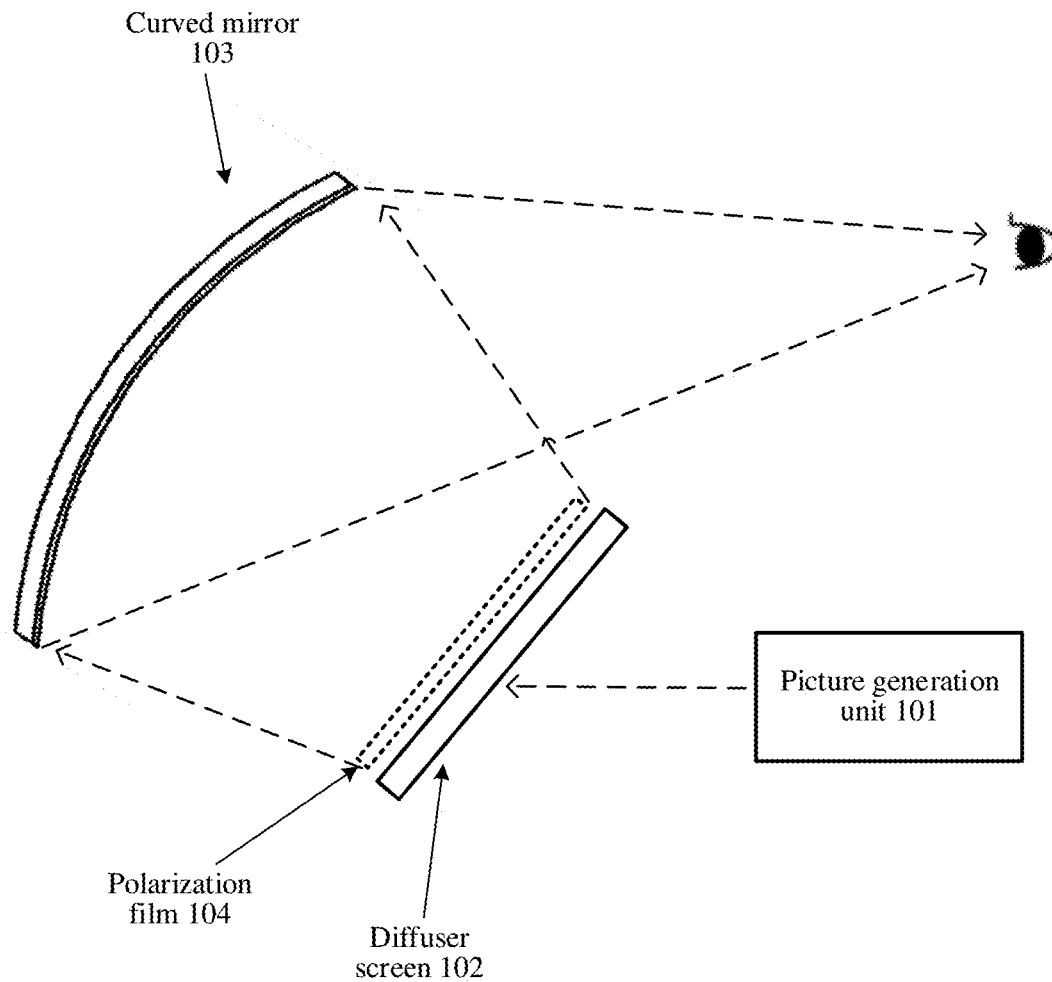
FIG. 4 is a schematic diagram of a structure of a display system according to an embodiment of this application.

A diffuser screen 102 may be a reflection diffuser screen or a transmission diffuser screen. In the scenario in FIG. 1, the diffuser screen 102 is a reflection diffuser screen. When the diffuser screen 102 is a transmission diffuser screen, only locations of the picture generation unit 101, the diffuser screen 102, and a curved mirror 103 need to be adjusted. FIG. 4 is a schematic diagram of a structure of another display system according to this application. In the scenario in FIG. 4, a diffuser screen 102 is a transmission diffuser screen.

A polarization film 104 may be disposed on the diffuser screen 102. As shown in FIG. 4, the polarization film 104 is configured to filter out interference light, for example, ambient light and stray light in a system.

Figure 5:
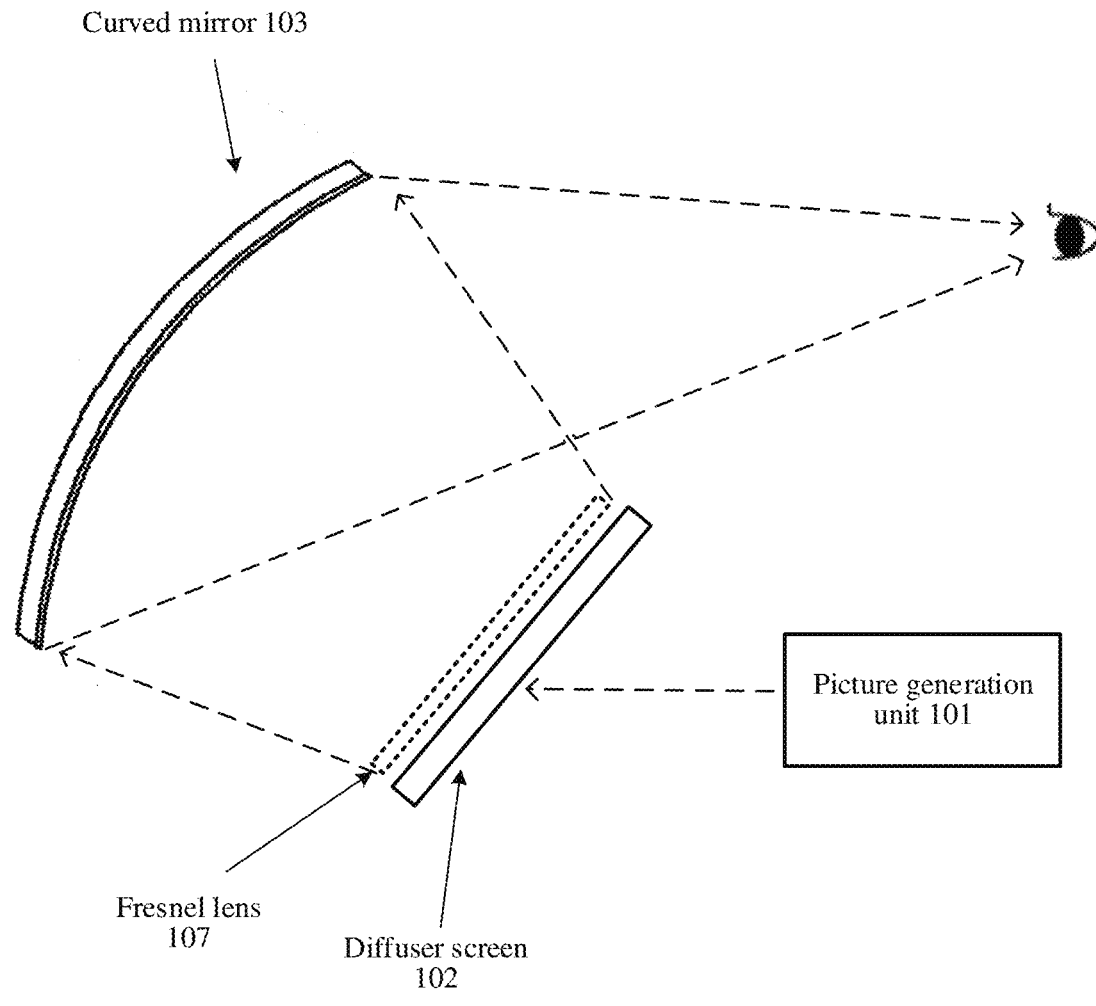
FIG. 5 is a schematic diagram of a structure of a display system according to an embodiment of this application.

A Fresnel lens 107 may be further disposed after the diffuser screen. As shown in FIG. 5, the Fresnel lens 107 may further increase a magnification multiple of a picture. A naked-eye 3D screen may be further disposed after the diffuser screen 102.

Figure 6:
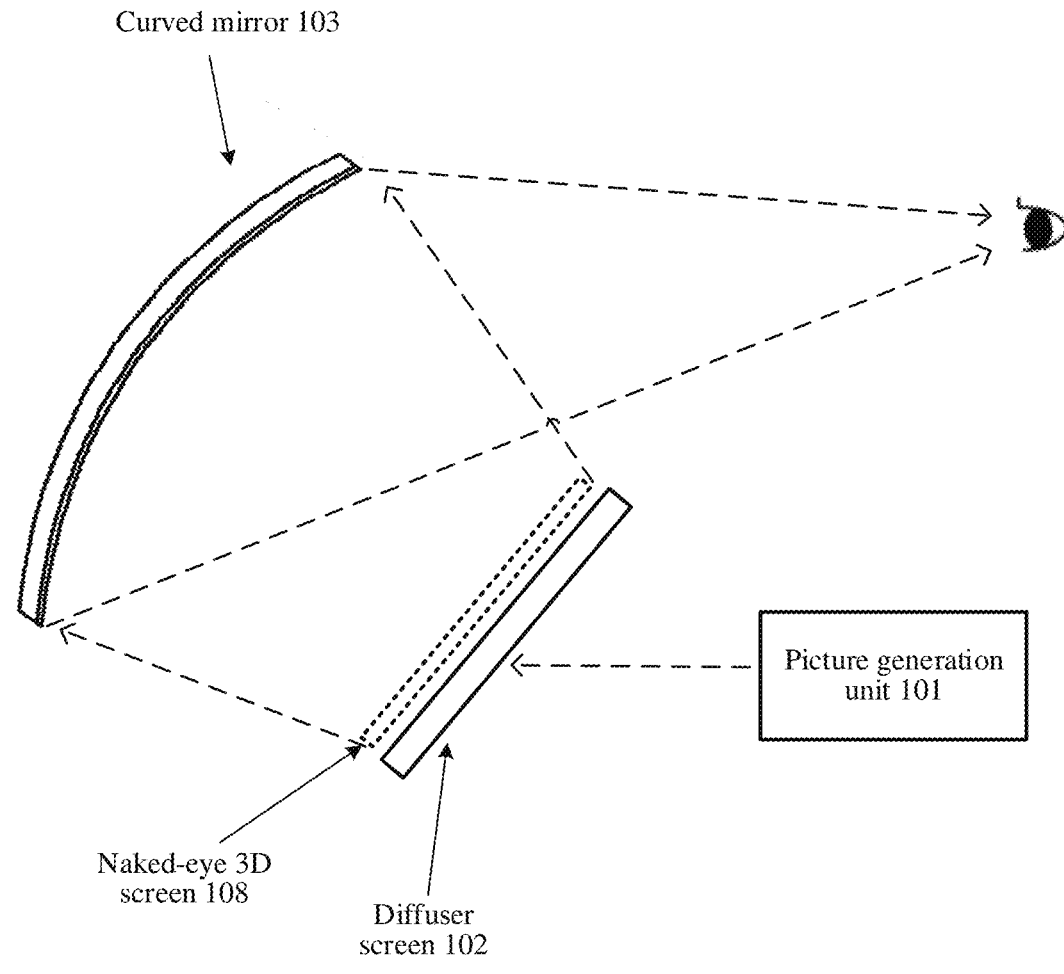
FIG. 6 is a schematic diagram of a structure of a display system according to an embodiment of this application.

As shown in FIG. 6, the naked-eye 3D screen is configured to implement binocular parallax, so that a user can experience a 3D effect. The naked-eye 3D screen may be a black-and-white grating, a cylindrical lens array, or a microlens array.

A periodic black-and-white grating is placed at a preset location away from the diffuser screen, and pixels in odd and even columns in a picture source may be separately projected onto the left eye and the right eye of the user at a preset observation point by selecting a proper grating period, to implement the binocular parallax and implement naked-eye 3D display experience. However, the black-and-white grating loses brightness of the display picture source. Alternatively, an effect of the naked-eye 3D screen may be implemented by using the cylindrical lens array. By selecting a proper period, focal length, and thickness of the cylindrical lens array, the pixels in the odd and even columns in the picture source may be separately projected onto the left eye and the right eye of the user at one observation point, to implement the binocular parallax and implement naked-eye 3D display experience. A two-dimensional naked-eye 3D display may be implemented by using a two-dimensional microlens array. By selecting a proper period, focal length, and thickness of the microlens array, pixels at different locations in the picture source may be separately projected onto the left eye and the right eye of the user at one observation point, to implement two-dimensional naked-eye 3D display experience.

In addition to the diffuser screen, a display screen or a tablet computer can also be used as the picture source in the system, and the naked-eye 3D screen can be superimposed to implement naked-eye 3D display experience.

Figure 7:
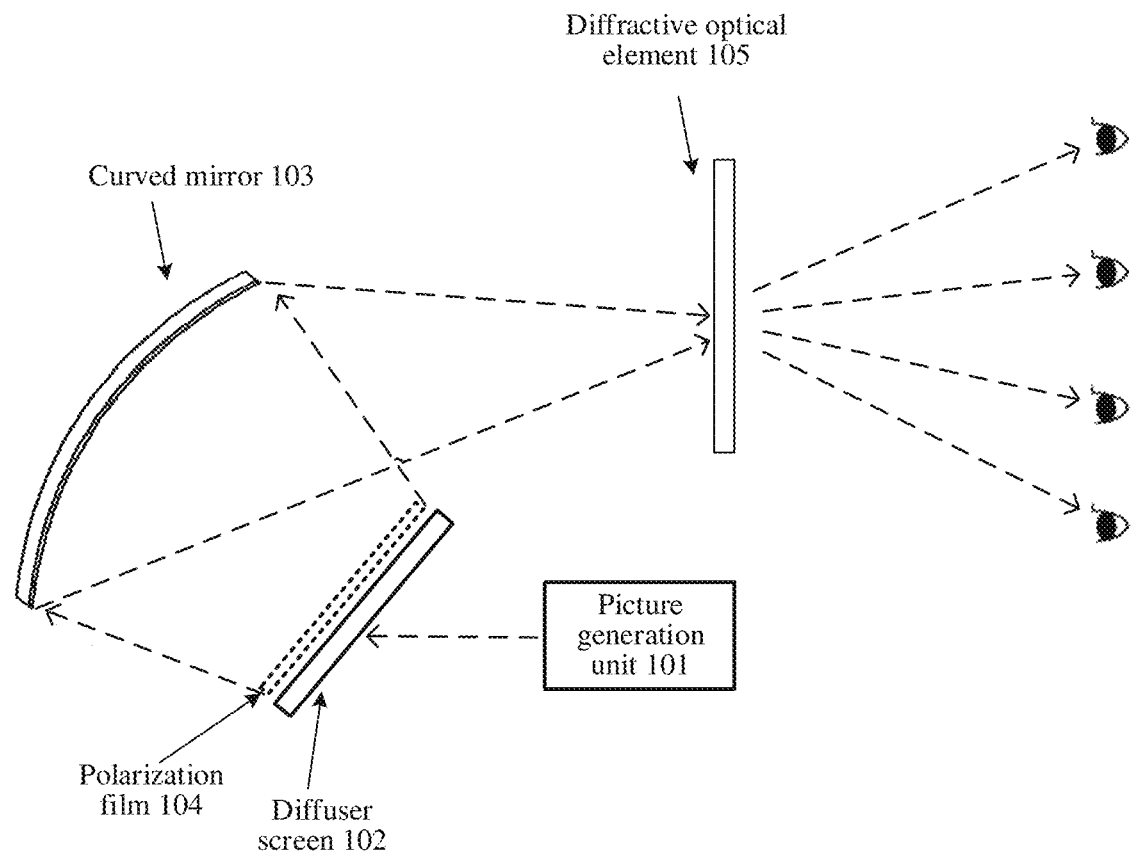
FIG. 7 is a schematic diagram of a structure of still another display system according to an embodiment of this application.

FIG. 7 is a schematic diagram of a structure of still another display system according to an embodiment of this application. The display system includes a picture generation unit 101, a diffuser screen 102, a curved mirror 103, and a diffractive optical element 105.

A difference between the structures of the display system shown in FIG. 7 and the display system shown in FIG. 2 lies in that: After the curved mirror 103 performs imaging, the diffractive optical element 105 performs diffractive light splitting, and the diffractive optical element 105 may split light reflected by the curved mirror into a plurality of beams of light at different angles. In this way, a plurality of users can view a picture at the same time.

Figure 8:
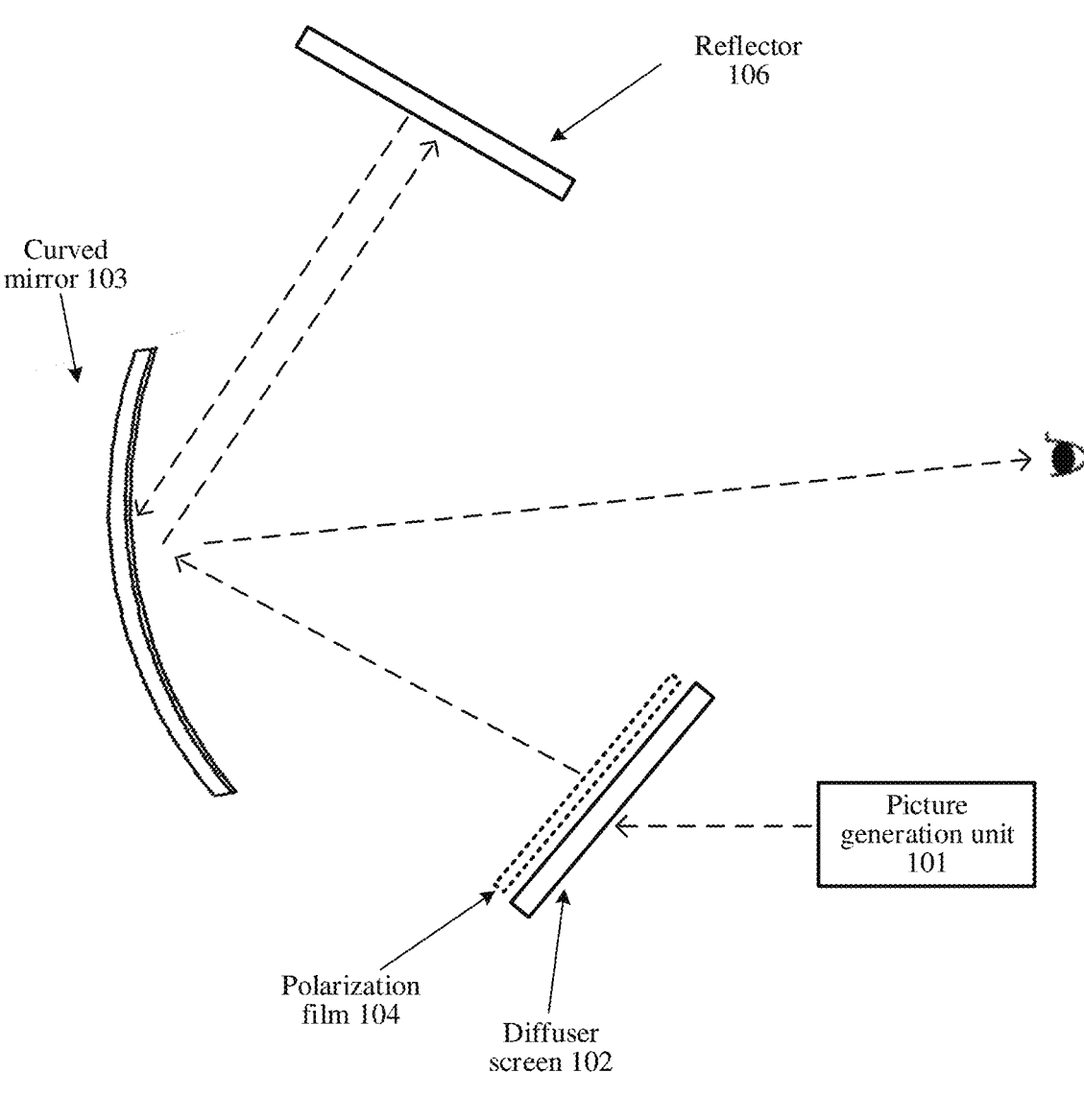
FIG. 8 is a schematic diagram of a structure of yet another display system according to an embodiment of this application.

FIG. 8 is a schematic diagram of a structure of yet another display system according to an embodiment of this application. The display system includes a picture generation unit 101, a diffuser screen 102, a curved mirror 103, and a reflector 106.

A difference between the structures of the display system shown in FIG. 8 and the display system shown in FIG. 2 lies in that: The curved mirror 103 needs to direct a light beam to the reflector 106 after magnification imaging for the first time. After the reflector 106 reflects the received light beam back to the curved mirror 103, the curved mirror 103 performs magnification imaging again, so that a magnification multiple of a picture can be further increased.

Figure 9:
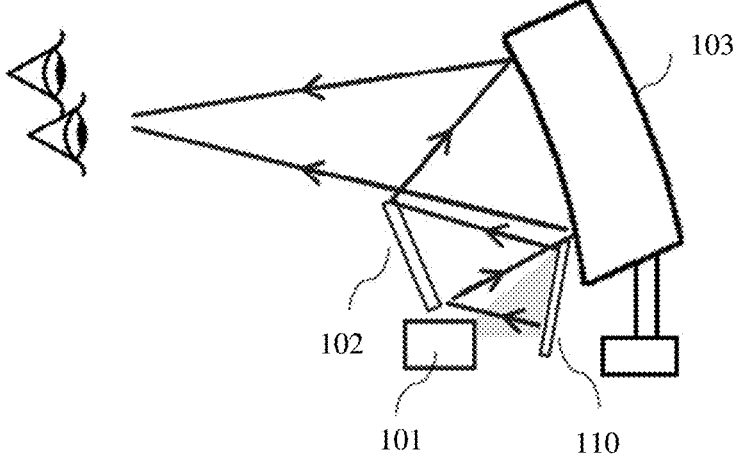
FIG. 9 is a schematic diagram of a structure of another display system according to an embodiment of this application.

FIG. 9 is a schematic diagram of a structure of another display system according to an embodiment of this application.

In addition to the foregoing picture generation unit 101, the diffuser screen 102, and the curved mirror 103, the display system provided in this embodiment may further include a first reflection element 110. The first reflection element 110 is located on an optical path between the picture generation unit 101 and the diffuser screen 102, and the first reflection element 110 is configured to reflect, to the diffuser screen 102, a real image generated by the picture generation unit 101.

The first reflection element 110 may be one of a plane mirror, a spherical mirror, or a freeform mirror, and may fold the optical path and reduce a size of the display system. When the first reflection element 110 is the freeform mirror, the first reflection element 110 may further change a shape of the picture generated by the picture generation unit 101, to implement distortion correction.

Figure 10:
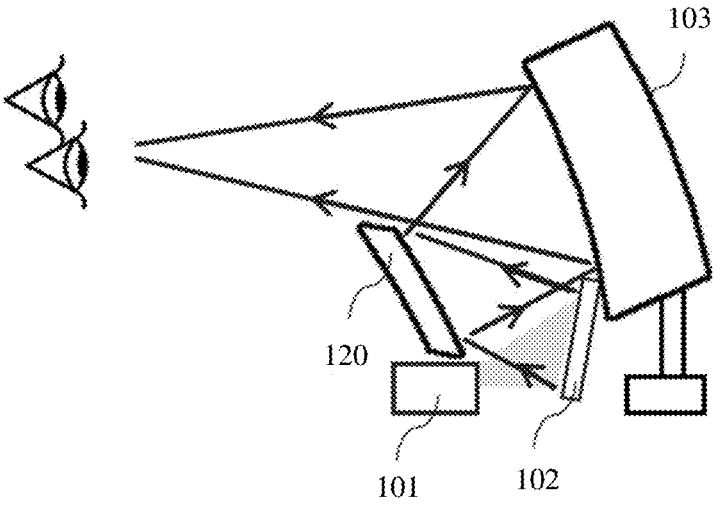
FIG. 10 is a schematic diagram of a structure of another display system according to an embodiment of this application.

FIG. 10 is a schematic diagram of a structure of another display system according to an embodiment of this application.

In addition to the picture generation unit 101, the diffuser screen 102, and the curved mirror 103, the display system provided in this embodiment may further include a second reflection element 120. The second reflection element 120 is located on an optical path between the curved mirror 103 and the diffuser screen 102, and the second reflection element 120 is configured to reflect, to the curved mirror 103, a real image obtained through diffuse reflection by the diffuser screen 102.

The second reflection element 120 may be one of a plane mirror, a spherical mirror, or a freeform mirror, and may fold the optical path and reduce a size of the display system. In addition, the second reflection element 120 may further implement distortion correction. For example, picture distortion caused by the second reflection element 120 is complementary to picture distortion caused by the curved mirror 103, so that the picture distortion caused by the curved mirror 103 can be eliminated.

Figure 11:
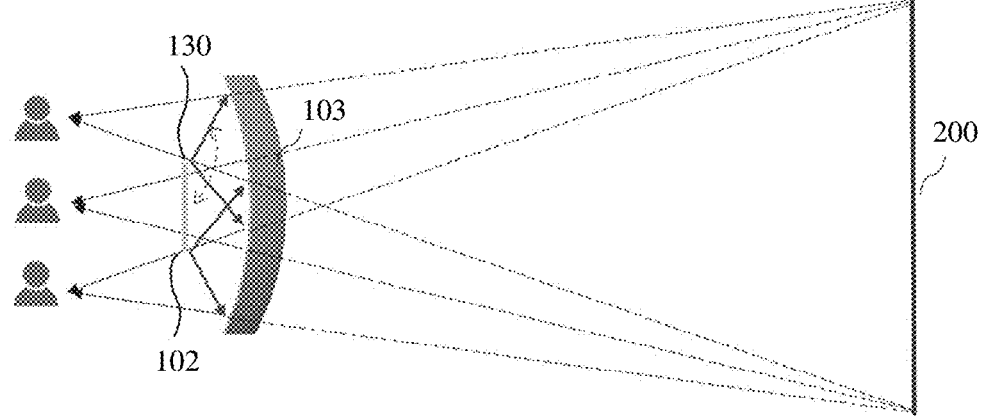
FIG. 11 is a schematic diagram of a structure of another display system according to an embodiment of this application.

FIG. 11 is a schematic diagram of a structure of another display system according to an embodiment of this application.

Compared with the foregoing embodiment, in addition to the picture generation unit 101 (not shown in FIG. 11), the diffuser screen 102, and the curved mirror 103, the display system provided in this embodiment may further include a diffuser film 130. The diffuser film 130 is located on a light-emitting side of the diffuser screen 102, and is configured to expand a transverse scattering angle (an angle shown by using a bidirectional arrow in the figure) of a real image obtained through diffuse reflection. Compared with the embodiments shown in FIG. 10 and FIG. 11, after the diffuser film 130 in this embodiment expands the transverse scattering angle, a ray of light reflected by the curved mirror 103 may reach eyes of a plurality of users, and there are three users in the figure, that is, all the three users can view a magnified virtual image 200. This embodiment can implement a technical effect of multi-user viewing.

FIG. 11 may be understood as a top view of the display system. For a structure of the picture generation unit 101 that is not shown and location relationships between the picture generation unit 101, the diffuser screen 102, and the curved mirror 103, refer to the embodiments shown in FIG. 1 to FIG. 10. Details are not described herein again.

The display system provided in this embodiment may magnify a transverse eye box range, to implement multi-user viewing. In addition, the diffuser film 130 may maintain or reduce a longitudinal (vertical to a direction of paper) divergence angle while expanding a transverse angle of departure, so that brightness of a picture viewed by the user is not greatly affected or basically unchanged.

Figure 12:
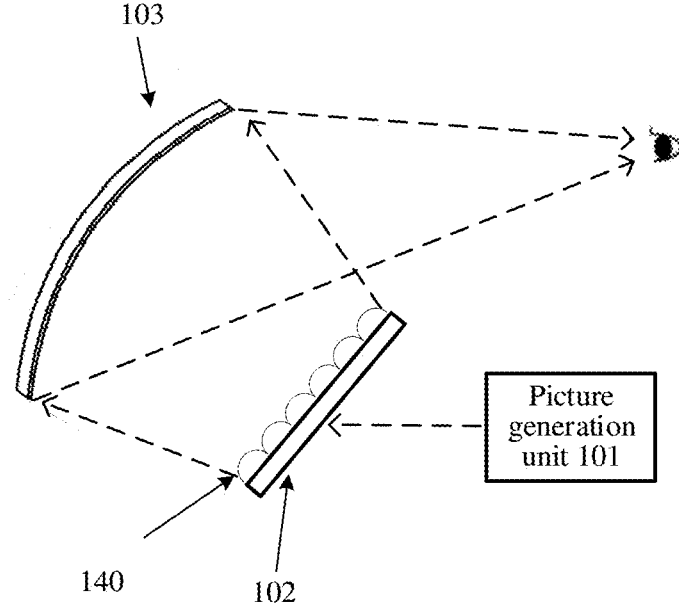
FIG. 12 is a schematic diagram of a structure of another display system according to an embodiment of this application.

FIG. 12 is a schematic diagram of a structure of another display system according to an embodiment of this application.

In addition to the picture generation unit 101, the diffuser screen 102, and the curved mirror 103, the display system provided in this embodiment may further include a cylindrical lens array 140. The cylindrical lens array 140 is disposed on a light-emitting side of the diffuser screen 102, and covers pixels of the diffuser screen 102.

Figure 13:
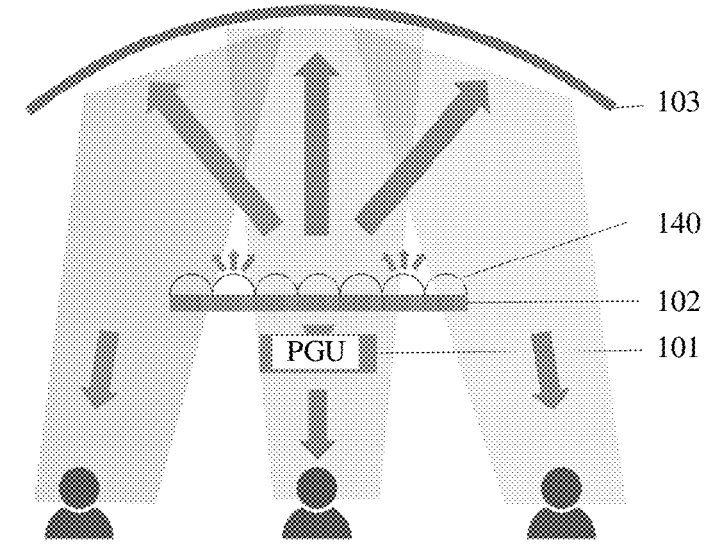
FIG. 13 is a schematic diagram of multi-user viewing in a display system according to an embodiment of this application.

The cylindrical lens array 140 includes a plurality of continuous cylindrical lenses (which may also be referred to as micro cylindrical lenses). Light emitted by different pixels through one cylindrical lens is refracted at different locations of the cylindrical lens, and is diffused in different directions (generating different refraction effects). Emitting light in the different directions reaches different locations on a freeform mirror, and enters eyes of users at different locations through reflection of the curved mirror 103. Therefore, the cylindrical lens array 140 in this embodiment may also expand an angle of departure of a ray of light, to implement a technical effect of multi-user viewing. FIG. 13 is a schematic diagram of multi-user viewing in a display system according to an embodiment of this application. A picture generated by a picture generation unit (PGU) 101 is projected onto a diffuser screen 102. The picture scattered by the diffuser screen 102 is refracted by a cylindrical lens array 140 to a curved mirror 103 (in a direction indicated by an upward arrow). The curved mirror 103 may reflect the picture to three users (in a direction indicated by a downward arrow), and the plurality of users may observe a magnified virtual image.

Figure 14:
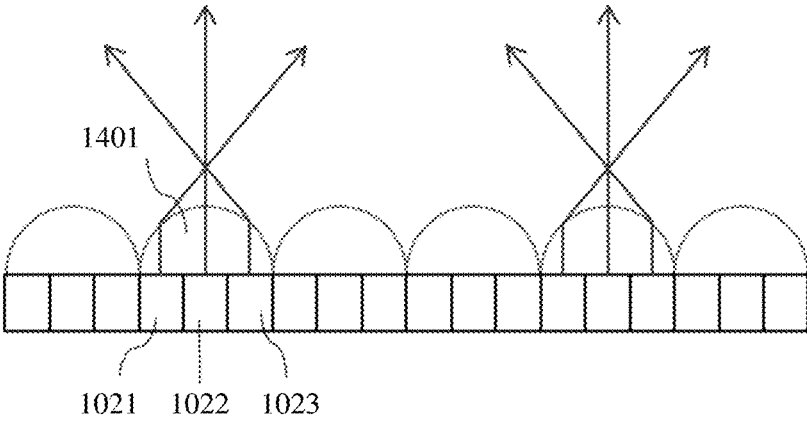
FIG. 14 is a schematic diagram of a magnified diffuser screen and a magnified cylindrical lens array in FIG. 12 and FIG. 13.

Further, for a specific location relationship between the cylindrical lens array 140 and the diffuser screen 102 in the display system provided in this embodiment, refer to FIG. 14. FIG. 14 is a partial magnified diagram of FIG. 12 and FIG. 13 (a magnified diagram of the diffuser screen 102 and the cylindrical lens array 140). As shown in FIG. 14, at least one cylindrical lens in the cylindrical lens array 140 covers at least two columns (three columns in the figure) of pixels of the diffuser screen 102. After light emitted by the three columns of pixels (1021, 1022, and 1023) is refracted by a cylindrical lens 1401, the light diverges in three directions (in transverse directions). For example, a ray of light emitted by the pixel column 1021 is refracted to the right, a ray of light emitted by the pixel column 1022 is directly emitted, and a ray of light emitted by the pixel column 1023 is refracted to the left.

In the display system provided in this embodiment, a curvature and a refractive index of the cylindrical lens in the cylindrical lens array 140 may be adjusted, to adjust an eye box of the picture, that is, the user may adjust a location of the eye box based on a location of the user.

Figure 15:
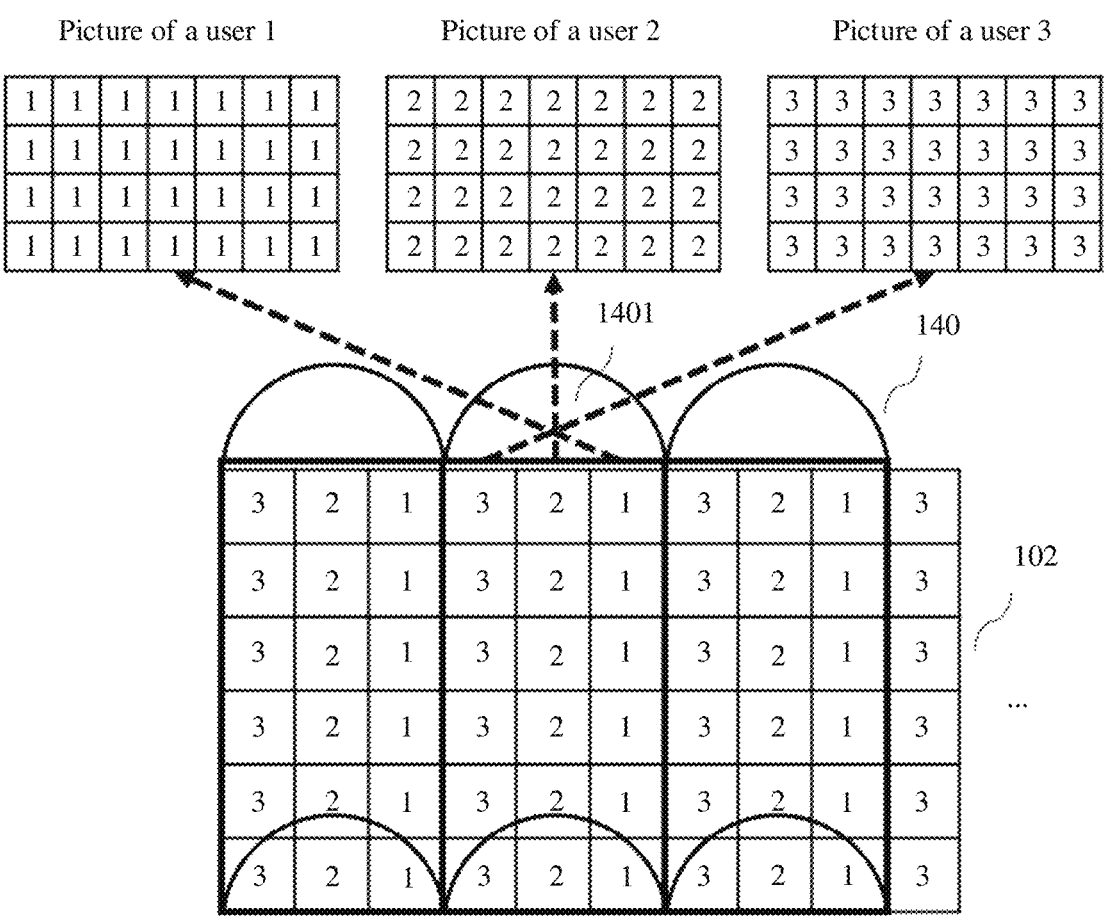
FIG. 15 and FIG. 16 are schematic diagrams in which a cylindrical lens array in a display system covers a pixel array in a diffuser screen according to an embodiment of this application.
Figure 16:
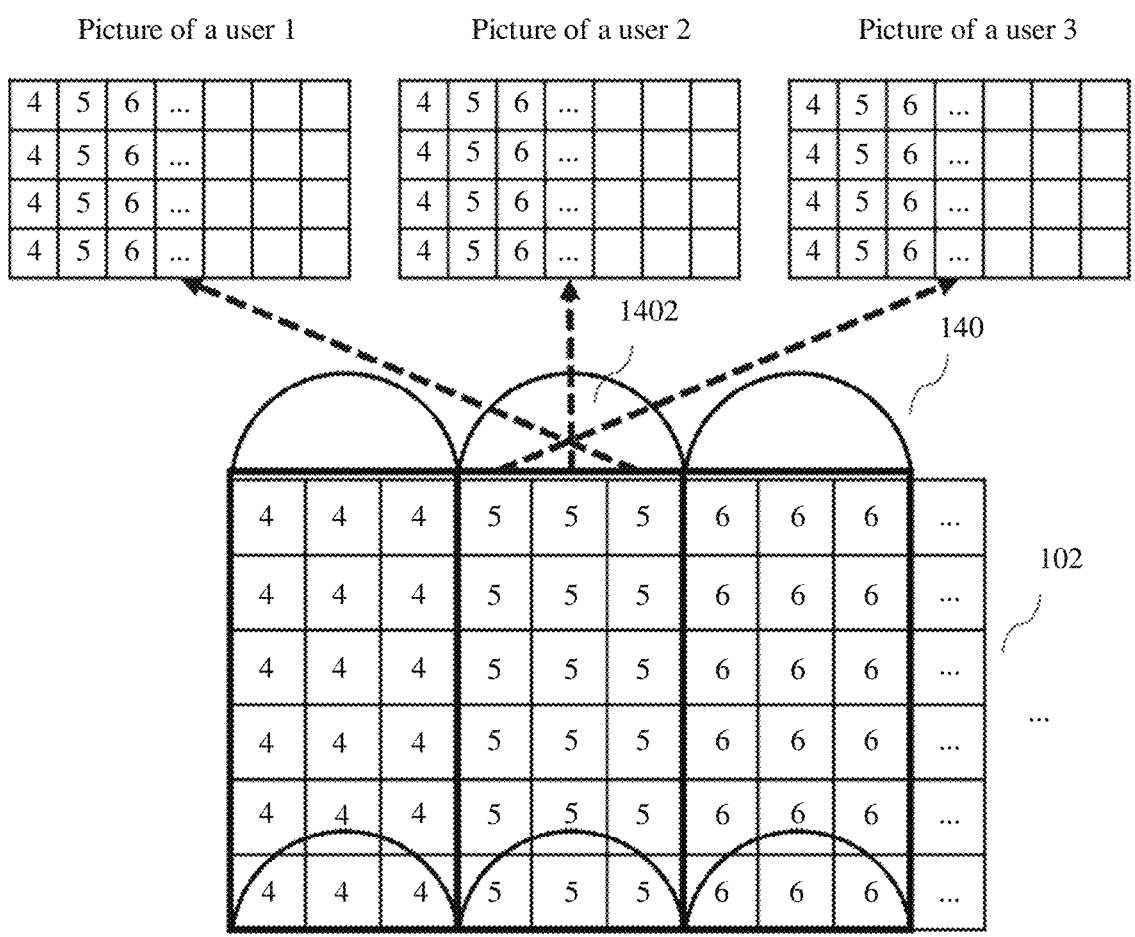

FIG. 15 and FIG. 16 are schematic diagrams in which a cylindrical lens array 140 in a display system covers a pixel array in a diffuser screen 102 according to an embodiment of this application.

As shown in FIG. 15, a plurality of pixel columns covered by a cylindrical lens 1401 in the cylindrical lens array 140 may separately display different pictures, to be specific, three columns of pixels in the figure separately display different pictures, and pictures viewed by different users are different. For example, a user 1 views content displayed by using pixels in the $3^{rd}$ column (from the left) covered by the cylindrical lens 1401, a user 2 views content displayed by using pixels in the $2^{nd}$ column (in the middle) covered by the cylindrical lens 1401, and a user 3 views content displayed by using pixels in the $1^{st}$ column (from the left) covered by the cylindrical lens 1401.

As shown in FIG. 16, a plurality of pixel columns covered by a cylindrical lens 1402 in the cylindrical lens array 140 may display a same picture, to be specific, three columns of pixels covered by the cylindrical lens 1402 in the figure all display a same picture, and pictures viewed by different users are the same. For example, a user 1 views content displayed by using pixels in the $3^{rd}$ column (from the left) covered by the cylindrical lens 1402, a user 2 views content displayed by using pixels in the $2^{nd}$ column (in the middle) covered by the cylindrical lens 1402, and a user 3 views content displayed by using pixels in the $1^{st}$ column (from the left) covered by the cylindrical lens 1402.

The different content displayed by using the pixels may be implemented by a picture generation unit 101 to preprocess the display picture, that is, specific content displayed by using the pixels is determined by the picture generation unit 101. For example, when different pictures are displayed to a plurality of users, the picture generation unit 101 may perform splitting and regrouping of pixel rows on different display pictures, to enable a corresponding user to view a corresponding picture pixel. Details are shown in FIG. 15. When a same picture is displayed to a plurality of users, the picture generation unit 101 may replicate, split, and combine picture pixels based on a period of the cylindrical lens. Details are shown in FIG. 16.

Dashed-line arrows in FIG. 15 and FIG. 16 indicates a correspondence between content displayed in a pixel column and content observed by a user, instead of a propagation path of a ray of light emitted by the pixel column. For a specific propagation path of a ray of light emitted by a pixel column, refer to FIG. 14.

The foregoing embodiment provides a case in which the cylindrical lens in the cylindrical lens array 140 covers a plurality of pixel columns. The cylindrical lens in the cylindrical lens array 140 may also cover a plurality of pixel rows. A display principle thereof is the same as that of the foregoing scenario in which the cylindrical lens covers the plurality of pixel columns. At this time, the cylindrical lens array 140 rotates 90 degrees clockwise or counter-clockwise. After light emitted by a plurality of pixel rows is refracted by the cylindrical lens, the light diverges in different directions (in longitudinal directions), and a plurality of users can also observe a magnified virtual image.

In the display system provided in this embodiment, a holographic diffusion element or another diffusion element may be further added on a light-emitting side of the cylindrical lens array 140, to smooth stripe display interference that may be introduced by the cylindrical lens array 140, and further enhance a display effect.

The terms "first", "second", and the like in this application are intended to distinguish between similar objects but do not necessarily indicate a specific order or sequence. It should be understood that the data used in such a manner is interchangeable in proper circumstances, so that the embodiments described herein can be implemented in an order not described in this application. To reflect a relationship between components in different embodiments more clearly, in this application, a same reference numeral is used to represent components with a same function or similar functions in different embodiments.

It should be further noted that, unless otherwise specified, specific descriptions of some technical features in one embodiment may also be applied to explain corresponding technical features mentioned in another embodiment.

For same or similar parts in embodiments of this application, refer to these embodiments. Particularly, for the embodiments in FIG. 4 to FIG. 8, because the embodiments are based on the embodiments corresponding to FIG. 1 to FIG. 3, descriptions are simple. For related parts, refer to partial descriptions in the embodiments corresponding to FIG. 1 to FIG. 3.

Finally, it should be noted that the foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A display system, comprising:
   a picture generation unit;
   a diffuser screen;
   a curved mirror; and
   a reflector configured to receive a light beam for imaging on the curved mirror and reflect the light beam back to the curved mirror,
   wherein the curved mirror is further configured to receive the light beam reflected by the reflector, to perform magnification imaging,
   wherein the picture generation unit is configured to generate a real image and perform imaging on the diffuser screen,
   wherein the diffuser screen is configured to perform diffuse reflection on the real image, and
   wherein the curved mirror is configured to perform imaging based on the real image obtained through diffuse reflection, to generate a magnified virtual image.

2. The display system according to claim 1, wherein the picture generation unit comprises:
   a light source configured to emit light beams;

a prism configured to combine light beams emitted by the light source;

a lens configured to collimate a combined light beam and direct the combined light beam to an imaging chip that is configured to generate the real image; and a projection lens configured to project the real image onto the diffuser screen.

3. The display system according to claim 2, wherein the picture generation unit further comprises a first diffractive optical element, the first diffractive optical element is located between the light source and the prism, and the first diffractive optical element is configured to split the light beams emitted by the light source.

4. The display system according to claim 2, wherein the picture generation unit further comprises a polarization processing element, and the polarization processing element is configured to adjust a polarization state of the light beam directed to the imaging chip.

5. The display system according to claim 4, wherein the polarization processing element is any one of the following elements: a polarization beam splitter (PBS), a quarter-wave plate, a half-wave plate, a polarizer, or a rotator.

6. The display system according to claim 1, further comprising:

a polarization film, wherein the polarization film is placed after the diffuser screen, and the polarization film is configured to filter out interference light.

7. The display system according to claim 1, further comprising:

a black-and-white grating, a cylindrical lens array, or a microlens array, wherein the black-and-white grating, the cylindrical lens array, or the microlens array is located after the diffuser screen.

8. The display system according to claim 1, wherein the picture generation unit comprises a light source comprising a plurality of primary-color sub-light sources.

9. The display system according to claim 8, wherein the picture generation unit further comprises a first diffractive optical element, the first diffractive optical element comprises a plurality of sub-optical elements, and the plurality of sub-optical elements are separately placed before the plurality of primary-color sub-light sources.

10. The display system according to claim 1, wherein the diffuser screen is a reflection diffuser screen or a projection diffuser screen.

11. The display system according to claim 1, further comprising:

a diffuser film, located on a light-emitting side of the diffuser screen, wherein the diffuser film is configured to expand a transverse scattering angle of the real image obtained through diffuse reflection.

12. The display system according to claim 1, further comprising:

a cylindrical lens array disposed on a light-emitting side of the diffuser screen and covering pixels of the diffuser screen.

13. A display system comprising:

a picture generation unit comprising:

a light source configured to emit light beams;

a prism configured to combine light beams emitted by the light source;

a lens configured to collimate a combined light beam and direct the combined light beam to an imaging chip configured to generate the real image; and a projection lens configured to project the real image onto the diffuser screen;

12 a diffuser screen;

a curved mirror; and a second diffractive optical element that is located after the curved mirror, and is configured to split a light beam reflected by the curved mirror, wherein the picture generation unit is configured to generate a real image and perform imaging on the diffuser screen, wherein the diffuser screen is configured to perform diffuse reflection on the real image, and wherein the curved mirror is configured to perform imaging based on the real image obtained through diffuse reflection, to generate a magnified virtual image.

14. A display system comprising:

a picture generation unit;

a diffuser screen;

a curved mirror; and a Fresnel lens placed after the diffuser screen, wherein the Fresnel lens is configured to magnify a real image passing through the diffuser screen, wherein the picture generation unit is configured to generate the real image and perform imaging on the diffuser screen, wherein the diffuser screen is configured to perform diffuse reflection on the real image, and wherein the curved mirror is configured to perform imaging based on the real image obtained through diffuse reflection, to generate a magnified virtual image.

15. A display system comprising:

a picture generation unit;

a diffuser screen;

a curved mirror; and a cylindrical lens array disposed on a light-emitting side of the diffuser screen and covering pixels of the diffuser screen, wherein the picture generation unit is configured to generate a real image and perform imaging on the diffuser screen, wherein the diffuser screen is configured to perform diffuse reflection on the real image, and wherein the curved mirror is configured to perform imaging based on the real image obtained through diffuse reflection, to generate a magnified virtual image, and wherein at least one cylindrical lens in the cylindrical lens array covers at least two columns of pixels of the diffuser screen.

16. The display system according to claim 15, wherein the at least one cylindrical lens in the cylindrical lens array covers three columns of pixels of the diffuser screen.

17. The display system according to claim 15, wherein a plurality of pixel columns covered by the at least one cylindrical lens in the cylindrical lens array separately display different pictures.

18. A display system comprising:

a picture generation unit;

a diffuser screen;

a curved mirror; and a first reflection element, located on an optical path between the picture generation unit and the diffuser screen, wherein the picture generation unit is configured to generate a real image and perform imaging on the diffuser screen, wherein the diffuser screen is configured to perform diffuse reflection on the real image, and wherein the curved mirror is configured to perform imaging based on the real image obtained through diffuse reflection, to generate a magnified virtual image wherein the first reflection element is configured to reflect, to the diffuser screen, the real image generated by the picture generation unit.

19. A display system comprising:

a picture generation unit;

a diffuser screen;

a curved mirror; and a second reflection element, wherein the picture generation unit is configured to generate a real image and perform imaging on the diffuser screen, wherein the diffuser screen is configured to perform diffuse reflection on the real image, and wherein the curved mirror is configured to perform imaging based on the real image obtained through diffuse reflection, to generate a magnified virtual image, wherein the second reflection element is located on an optical path between the curved mirror and the diffuser screen, and wherein the second reflection element is configured to reflect, to the curved mirror, the real image obtained through diffuse reflection by the diffuser screen.

* * * * *